(No Model.)

G. MORGEL.
CHECKREIN HOLDER.

No. 394,591. Patented Dec. 18, 1888.

Witnesses:
John Schuman.
M. E. Hunt

Inventor:
George Morgel.

By Charles J. Hunt.
Att'y

UNITED STATES PATENT OFFICE.

GEORGE MORGEL, OF BRAZIL, INDIANA.

CHECKREIN-HOLDER.

SPECIFICATION forming part of Letters Patent No. 394,591, dated December 18, 1888.

Application filed September 27, 1888. Serial No. 286,610. (No model.)

*To all whom it may concern:*

Be it known that I, GEORGE MORGEL, of Brazil, in the county of Clay and State of Indiana, have invented new and useful Improvements in Checkrein-Holders; and I do hereby declare that the following is a full, clear, and exact description thereof, reference being had to the accompanying drawings, which form a part of this specification.

My invention relates to that class of checkrein-holders that permits the horse to be relieved from the restraint of the checkrein and to renew the check at the will of the driver without the driver leaving the vehicle; and it consists in mounting the checkrein-holder on a lever properly pivoted and attached to the saddle-tree of the harness, with means for retaining the lever in its working position, with means for releasing the lever when desired, and with means to bring it back into place when it is requisite to recheck the horse, and in the particular combination and arrangement of the several parts, as hereinafter more specifically set forth.

The object of my invention is to provide means for unchecking a horse to enable him to drink, and to recheck him while the driver remains in the vehicle, and it will be appreciated by all drivers and those who have been in the habit of watering their horses as often as horses need watering when driving along the road.

Figure 1:
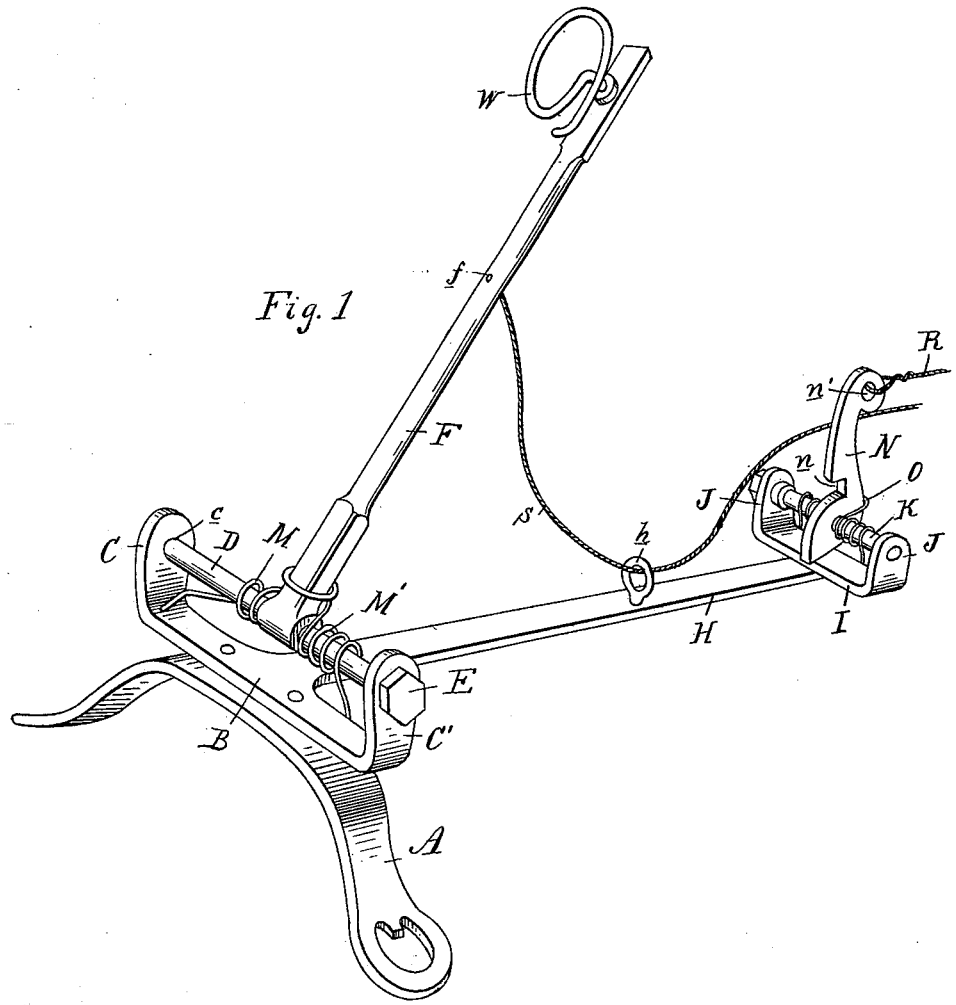
Figure 2:
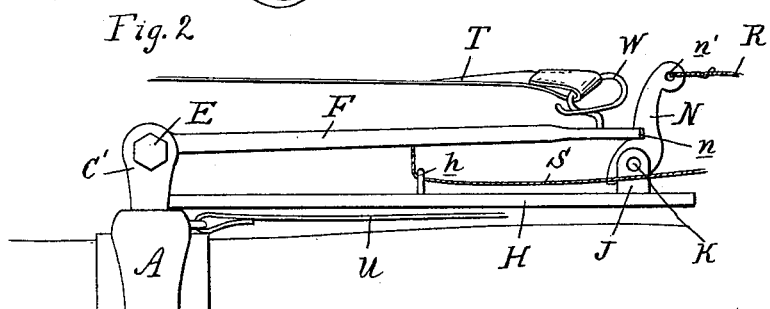

Figure 1 is a perspective view showing the rein-holder partly relieved. Fig. 2 is a side view showing the rein-holder in operation and holding the checkrein.

A is the saddle-tree of the harness, to which is firmly riveted the cross-bar B. This cross-bar is turned up at its ends, forming the brackets or arms C C'. The rock-shaft D is journaled in proper journal-bearings in the arms C C'. To the rock-shaft D is attached the arm F, bearing near its outer end the checkrein-holder W, which may be fastened on with a screw and nut or in any appropriate method. To cause the rock-shaft D to rotate in a forward direction, the spring M is coiled around the rock-shaft at one end, with its free end resting against the back side of the cross-bar B when the arm F is projected to the rear, and the spring M' is coiled around the rock-shaft at the opposite end, with its free end resting against the front side of the cross-bar B when the arm F is thrown forward.

H is an arm projecting from the rear of the cross-bar B, and carries on its outer end the cross-bar I. The ends of the cross-bar I are turned up, forming the brackets or arms J J'. The rock-shaft K is journaled in proper journal-bearings in the arms J J'.

N is a latch or catch suitably keyed onto the rock-shaft K, and is held in position by the spring O, coiled around the rock-shaft K, and having its outer ends attached to the cross-bar I. A rectangular recess, $n$, is cut in the front edge of the latch N to engage with the outer end of the arm F, carrying the checkrein-holder, and hold it in position while the horse is checked up. There is a perforation, $n'$, through the upper end of the latch N, in which is fastened the line R. This line may be carried directly to the vehicle and be properly fastened, or its loose end may be suspended by rings and hooks on the breeching or back-strap of the harness within reach of the driver.

An aperture, $f$, is made near the center of the arm carrying the checkrein-holder, in which is fastened the line S. A screw-eye, $h$, is inserted in the arm H slightly backward from the aperture $f$ in the arm F, and the line S is rove through this screw-eye and carried to the vehicle or disposed of in the same manner as the line R.

T is the checkrein.

U is the back-strap of the harness, to which the rear end of the arm H is secured by a rivet or loop whenever it may be desired.

Whenever it is necessary to uncheck the horse, a slight pull on the line R causes the latch to release the arm F, which will be moved up and forward by the force of the coil-spring M on the rock-shaft D until it passes over and forward of the saddle of the harness. Then the coil-spring M' comes into operation and prevents the arm from falling too low in its forward position. To recheck the horse, it is only necessary to draw on the line S, which will bring the arm F back and down to its rearward position, and it will engage with and be retained by the latch, and the lines R and S can be put aside in their proper position.

It is evident that the strings may be attached to the arm and latch by other proper means than those shown.

What I claim as my invention is—

1. The saddle-tree, and in combination therewith the cross-bar with its arms, the rock-shaft journaled therein, the arm bearing the checkrein-holder, and the checkrein-holder, substantially as shown and described.

2. The combination of the saddle-tree, the arm carrying the checkrein-holder, the checkrein-holder, the means for pivoting the arm carrying the checkrein-holder to the saddle-tree, and the means for raising the arm carrying the checkrein-holder when released from the restraining device, substantially as shown and described.

3. The combination of the saddle-tree, the arm carrying the checkrein-holder, the checkrein-holder, the means for pivoting the checkrein-holder to the saddle-tree, and the means to prevent the arm carrying the checkrein-holder from dropping too low when thrown forward, substantially as shown and described.

4. The combination of the saddle-tree, the means for pivoting the arm carrying the checkrein-holder to the saddle-tree, the arm carrying the checkrein-holder, the checkrein-holder, the locking device for locking the arm carrying the checkrein-holder in position when the horse is checked up, and the means for releasing the locking device, substantially as shown and described.

5. The combination of the saddle-tree, the means for pivoting the arm carrying the checkrein-holder to the saddle-tree, the arm carrying the checkrein-holder, the checkrein-holder, and the means for locking the arm carrying the checkrein-holder in position when the horse is checked up, substantially as shown and described.

6. The combination of the saddle-tree, the means for pivoting the arm carrying the checkrein-holder to the saddle-tree, the arm carrying the checkrein-holder, the checkrein-holder, the locking device for locking the arm carrying the checkrein-holder in position when the horse is checked up, the means for releasing the locking device, and the means for drawing the arm carrying the checkrein-holder back into the locking device after it has been released, substantially as shown and described.

7. The combination of the saddle-tree, the arm carrying the locking-catch, the locking-catch, the means for pivoting the arm carrying the checkrein-holder to the saddle-tree, the arm carrying the checkrein-holder, and the checkrein-holder, substantially as shown and described.

8. The combination of the saddle-tree, the arm carrying the locking-catch, the locking-catch, the spring for actuating the locking-catch, the means for pivoting the arm carrying the checkrein-holder to the saddle-tree, the arm carrying the checkrein-holder, and the checkrein-holder, substantially as shown and described.

9. The combination of the saddle-tree, the arm carrying the locking-catch provided with the screw-eye for the passage of the line bringing down the arm carrying the checkrein-holder, the locking-catch, the spring actuating the locking-catch, and the means for drawing the arm carrying the checkrein-holder down into the locking device, the means for pivoting the arm carrying the checkrein-holder to the saddle-tree, the arm carrying the checkrein-holder, and the checkrein-holder, substantially as shown and described.

10. The combination of the saddle-tree, the arm carrying the locking-catch, the screw-eye for the passage of the line drawing the arm carrying the checkrein-holder down into the locking-catch, the locking-catch, the spring actuating the locking-catch, the means for pivoting the arm carrying the checkrein-holder to the saddle-tree, the arm carrying the checkrein-holder, the checkrein-holder, the means for drawing the arm carrying the checkrein-holder down into the locking device, and the means for releasing the locking device, substantially as shown and described.

GEORGE MORGEL.

Witnesses:
PETER T. LUTHER,
JOSEPH LENHART.